United States Patent [19]
Stewart

[11] Patent Number: 5,678,282
[45] Date of Patent: Oct. 21, 1997

[54] JEWELRY CLASP

[76] Inventor: Kimberly D. Stewart, 12307 E. Cobblestone, Indianapolis, Ind. 46236

[21] Appl. No.: 594,922

[22] Filed: Jan. 31, 1996

[51] Int. Cl.$^6$ .................................................. A44B 21/00
[52] U.S. Cl. .......................... 24/68 J; 24/573.1; 24/589; 24/654; 403/319
[58] Field of Search ........................ 24/573.1, 573.7, 24/68 J, 652, 654, 589; 403/341, 286, 364, 319

[56] References Cited

U.S. PATENT DOCUMENTS

| | | |
|---|---|---|
| 328,822 | 10/1885 | Spruce . |
| 457,012 | 8/1891 | Roberts . |
| 821,086 | 5/1906 | Cannan . |
| 1,193,135 | 8/1916 | Gerstner et al. ............... 24/589 |
| 2,620,248 | 12/1952 | Mutchnik ................... 24/573.7 X |
| 3,165,804 | 1/1965 | Marosy . |
| 3,848,417 | 11/1974 | Smith et al. ............... 24/573.1 X |
| 4,611,367 | 9/1986 | Meulenberg et al. . |
| 4,671,528 | 6/1987 | Thompson . |

FOREIGN PATENT DOCUMENTS

| | | | |
|---|---|---|---|
| 2236443 | 2/1975 | France | ................. 24/573.1 |

*Primary Examiner*—James R. Brittain
*Attorney, Agent, or Firm*—Plews Shadley Racher and Braun

[57] ABSTRACT

A jewelry clasp (10) comprises a pair of opposite interlocking members (30). Each of the interlocking members has a top portion (26), a bottom portion (28), and a forward and a rearward end (25,27), respectively. The interlocking members have forward end tines (24). Each of the tines has a transverse bore extending therethrough. A pin (60) is provided for inserting through the bores to lock the interlocking members together in a closed position. The pin has a top (62), a terminal end (80) and an shank (70) therebetween. The top has a bore (67) extending through it. A pair of upstanding posts (50,51) are secured to the top portion of each of the interlocking members. The top of the pin protrudes a height at least as great as the posts when the pin is fully inserted in the bores. At least one of the bores and at least a portion of the shank have complementary threads (31,81). A resilient locking clip (90) extends through the bore in the top of the pin and is positioned on the posts for securing the pin when the clasp is in the closed position. One of the posts (50) has a terminal head (52) such that the clip cannot be separated from the clasp.

12 Claims, 4 Drawing Sheets

JEWELRY CLASP

BACKGROUND

The present invention pertains to fastening devices and more particularly pertains to a jewelry clasp having a locking clip.

Jewelry items such as necklaces, bracelets, wrist watches, and so on require some kind of a fastener in order to keep them secured to the person. The crux of the problem presented to the jewelry industry is how to make jewelry clasps functionally competent without detracting from the overall appearance of the piece. In other words, jewelry clasps must abide by principles of both form and function. Clasps heretofore available often compromise function in the name of aesthetic appeal.

Among the important features a merchantable jewelry clasp must have are (1) it must effectively hold together and not come unfastened while the jewelry is being worn, (2) it must be easy to manipulate between the open and closed positions and (3) jewelry clasps must be aesthetically pleasing and not detract from the overall appearance of the piece.

The clasp must effectively secure the piece to the person. The safety and security features the clasp offers are especially important. In this connection, the value of the piece of jewelry often depends largely upon the safety the clasp provides. Clasps often fit loosely sometimes to the extent they come apart and the piece is lost or broken. Thus, the selection of jewelry may oftentimes be dependent upon its particular clasp.

Another problem is that operating the clasp must be easy and convenient. Fumbling to locate the proper notch or to operate a particular spring-loaded element is common among jewelry wearers. This is especially the case with small and even tiny clasps. Often these clasps require another person's assistance, thus becoming a troublesome job. In addition, tiny spring-loaded elements are easy to break, and they lose their elasticity.

Therefore, it is highly desirable to provide an improved jewelry clasp having a locking clip.

It is also highly desirable to provide an improved jewelry clasp having a locking clip capable of locking the clasp together ensuring it does not come unfastened while the jewelry is being worn.

It is also highly desirable to provide an improved jewelry clasp having a locking clip that can be easily manipulated between the open and closed positions.

It is also highly desirable to provide an improved jewelry clasp having a locking clip that does not fit loosely.

It is also highly desirable to provide an improved jewelry clasp having a locking clip without spring-loaded elements, which become inelastic, need repair, and break.

It is also highly desirable to provide an improved jewelry clasp that is both functionally sound and aesthetically pleasing.

It is finally highly desirable to provide an improved jewelry clasp which meets all the above desired features.

SUMMARY

Therefore, it is an object of the invention to provide an improved jewelry clasp having a locking clip.

It is also an object of the invention to provide an improved jewelry clasp having a locking clip capable of locking the clasp together ensuring it does not come unfastened while the jewelry is being worn.

It is also an object of the invention to provide an improved jewelry clasp having a locking clip that can be easily manipulated between the open and closed positions.

It is also an object of the invention to provide an improved jewelry clasp having a locking clip that does not fit loosely.

It is also an object of the invention to provide an improved jewelry clasp having a locking clip without spring-loaded elements, which become inelastic, need repair, and break.

It is also an object of the invention to provide an improved jewelry clasp that is both functionally sound and aesthetically pleasing.

It is finally an object of the invention to provide an improved jewelry clasp which meets all the above desired features.

In the broader aspects of the invention there is provided a jewelry clasp having a pair of opposite interlocking members. The interlocking members each have a top portion, a bottom portion, and forward and rearward ends. An upstanding post is secured to the top portion of each of the interlocking members. A bore for receiving a pin extends through the forward ends of each of the interlocking members, and a resilient locking clip with an interior is positioned on the posts for securing the pin when the pin is in the bore and the interlocking members are locked together in a closed position.

DRAWINGS

The above mentioned and other features and objects of the invention and the manner of attaining them will become more apparent and the invention itself will be better understood by reference to the following description of an embodiment of the invention taken in conjunction with the accompanying drawings and descriptive matter in which there is illustrated preferred embodiments of the invention.

DESCRIPTION

Figure 1:
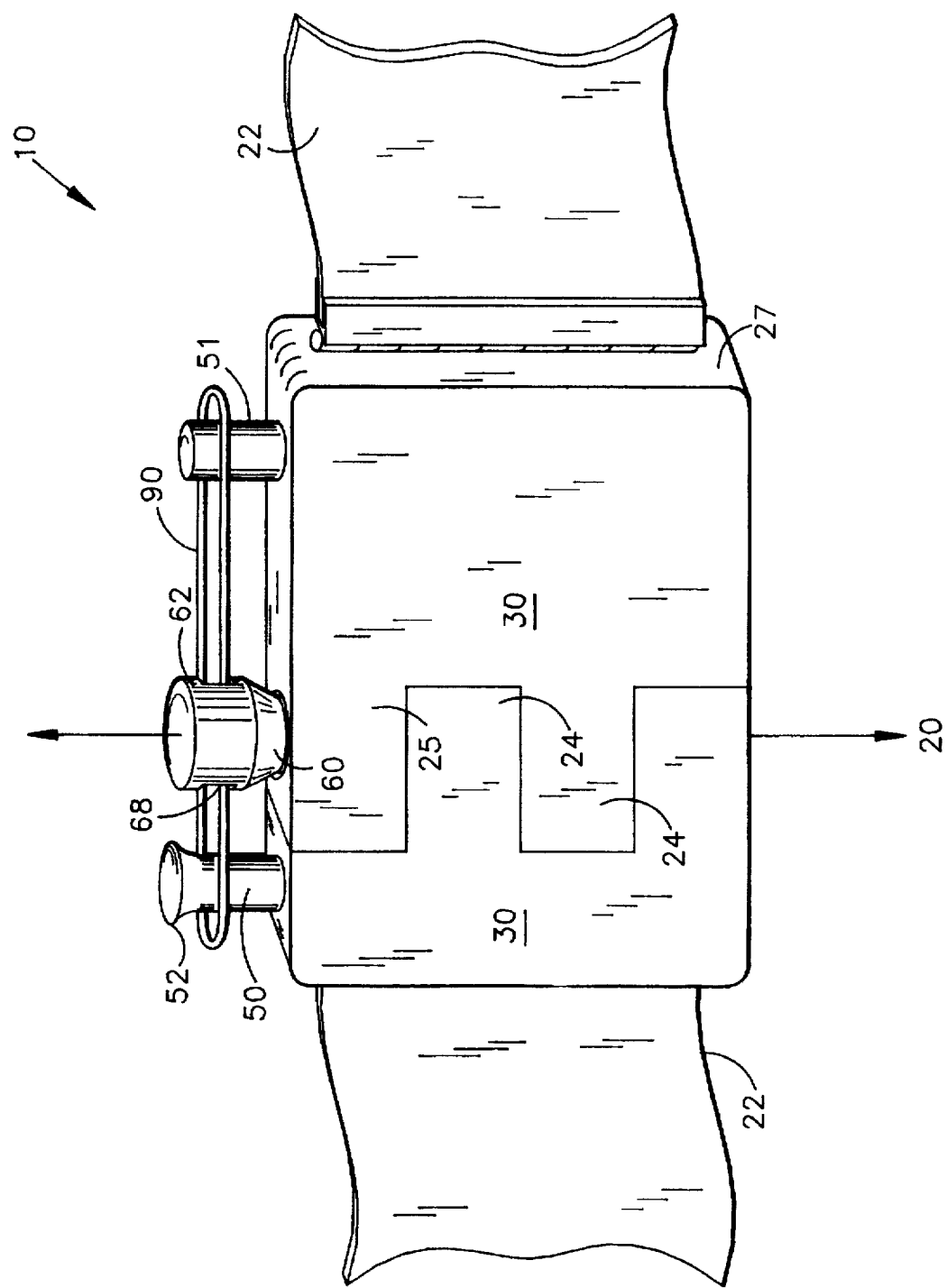
FIG. 1 is a front elevated perspective view of an embodiment of the jewelry clasp of the invention in the closed positions.

Referring to FIG. 1, jewelry clasp 10 of the invention has a pair of opposite interlocking members 30, a pin 60 and a resilient clip 90. Interlocking members 30 are generally formed from a precious metal, such as gold or silver, but can be formed of cheaper material where the value of the jewelry piece does not justify the use of expensive metals. However, certain requirements of the invention as set forth herein require that interlocking members 30 be substantially rigid. Thus, a strong machinable material is preferred. Interlocking members 30 are secured at rearward ends 27 to jewelry filaments 22. Filaments 22 are made of chain, pearls, or other jewelry material as desired and rearward ends 27 are secured to filaments 22 by known means.

Figure 2:
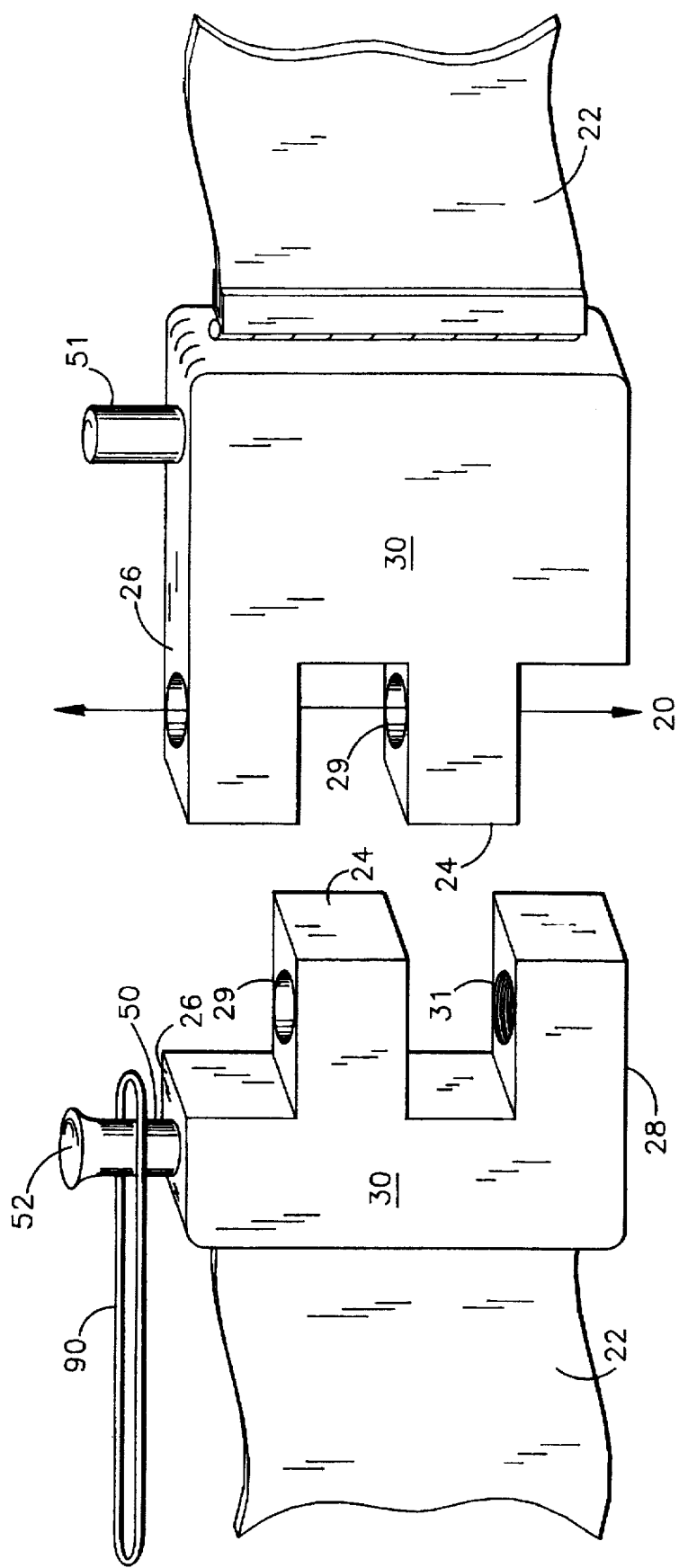
FIG. 2 is a front elevated perspective view of an embodiment of the jewelry clasp of the invention in the open position.
Figure 6:
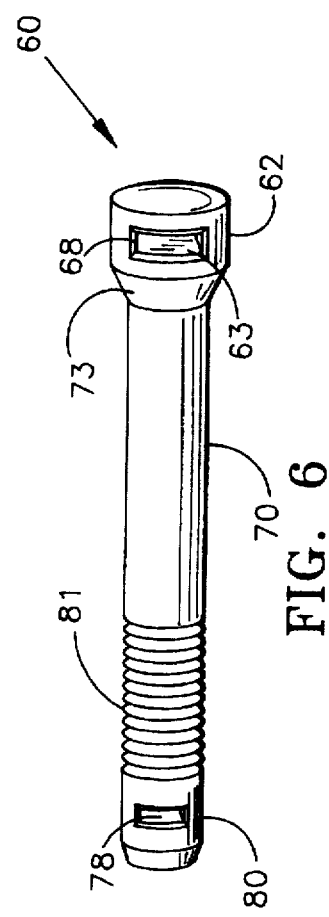
FIG. 6 is a side perspective view of the pin of the invention.

Referring now to FIGS. 1–6, interlocking members 30 each have a top portion 26, a bottom portion 28, and forward end tines 24. In an embodiment, interlocking members 30 have two tines 24 each, but more may be used as desired. A pair of upstanding posts 50,51 are secured to top portions 26. Posts 50,51 are preferably formed of the same material as interlocking members 30 and may be formed integrally therewith. One of posts 50,51 has terminal head 52. Bores 29 extend through tines 24, as shown in FIG. 2. In an embodiment bores 29 have threads 86. Elongated pin 60 has a top 62, a terminal end 80 and a shank 70 therebetween. Tapered portion 73 connects body 70 and top 62. Pin 60 may be formed from the same material as interlocking members 30 and posts 50,51. In an embodiment of the invention, as shown in FIG. 6, top 62 of elongated pin 60 has a bore 68 with interior wall 63 extending therethrough and body 70 has threads 81. In an embodiment, a second bore 78 extends through terminal end 80. In that embodiment, terminal end 80 extends slightly beyond the surface of bottom portion 28 so that additional jewelry items, such as chains or charms for example, may be attached to clasp 10.

Resilient clip 90 is positioned on posts. The interior 92 of resilient clip 90 is smaller than the diameter of terminal head 52 but slightly greater than the diameter of the cross-section of post 50, much like a golf tee threading a paper clip. Thus, clip 90 is inseparable from post 50, but is free to spin circumferentially about and move forward and rearward relative to post 50 when clasp 10 is in the open positions as shown in FIG. 2. In an embodiment, posts 50,51 have a generally round cross-section, but posts 50,51 may have a square or other polygonal cross-section as desired. However, round posts 50,51 are best for allowing the above-described unfettered movement of clip 90.

Jewelry clasp 10 is easy to assemble. Tines 24 of opposing interlocking members 30 are brought together and fitted such that bores 29 form a single bore (not shown) extending from the top portion 26 of one of the interlocking members 30 to the bottom portion 28 of the other interlocking member 30. Bores 29 are generally aligned along axis 20 when the jewelry clasp 10 is in the closed position, as shown in FIG. 1. Once done, interlocking members 30 can be locked together in a closed position. First, clip 90 must be moved rearwardly relative to post 52 such that the vast majority of locking clip 90 extends away from the general vicinity of bores 29 toward the rearward end 27 of interlocking member 30. See FIG. 2. The wearer can now insert pin 60 into bores 29.

Top 62 of pin 60 is large enough for a human hand to easily grasp and maneuver pin 60 into bore 29 enabling the wearer to fasten jewelry clasp 10 without assistance from another. Bores 29 receive pin 60, and pin 60 may be threaded into bore 29. Though the entire shank 70 of pin 60 and all of bores 29 may be threaded, in one embodiment, only the terminal end 72 of shank 70 and the last bore 29 to receive pin 60 have threads 81,31, respectively, as shown in FIG. 2. This embodiment permits most of shank 70 to be inserted into bore 29 before pin 60 has to be turned, thus making the clasping operation faster and more convenient than would be the case if other prior-in-sequence bores 29 were also threaded. After pin 60 has been fully inserted into bores 29, resilient locking clip 90 can be locked into position.

Pin 60 may first require a slight turning adjustment in order to align slot 68 with the longitudinal axis (not shown) of clasp 10. The tolerances of body 70, threads 81,31 and tapered portion 73 are such that pin 60 requires no more than a one-quarter revolution to align slot 68 as above-mentioned. Thus, the turning adjustment has no significant bearing on the depth that pin 60 penetrates bores 29. Pin 60 generally requires even less than a one-quarter revolution to axially align slot 68 with clip 90. Slot 68 receives clip 90 as the wearer moves clip 90 through slot 68 in the direction of post 51. Once done, the end of resilient clip 90 opposite post 50 is lifted upward, and interior 92 of clip 90 receives post 51, thus locking jewelry clasp 10 into its closed position. See FIGS. 1 and 3. Clip 90 prevents pin 60 from turning within bores 29 and keeps jewelry clasp 10 from loosening.

Figure 3:
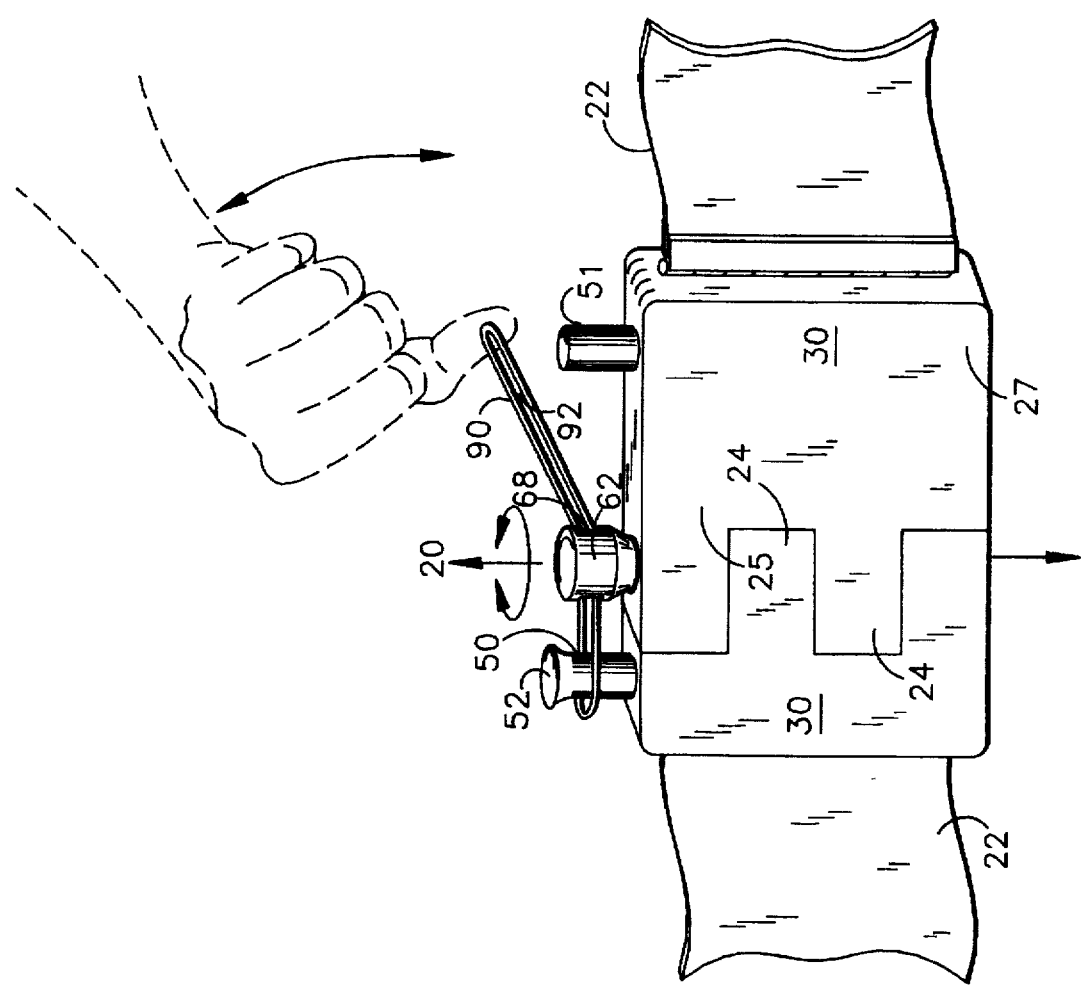
FIG. 3 is the front elevated perspective view of FIG. 1 showing the operation of the resilient locking clip of the invention.
Figure 4:
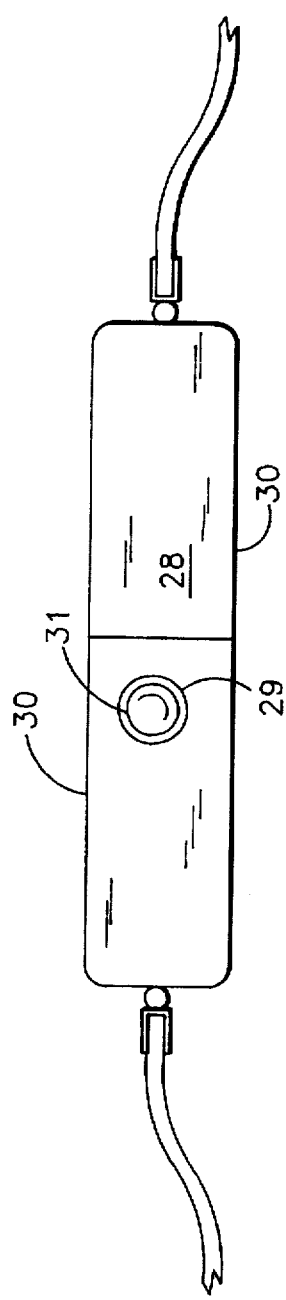
FIG. 4 is a bottom plan view of FIG. 1 showing the bottom portions of the interlocking members of the invention.
Figure 5:
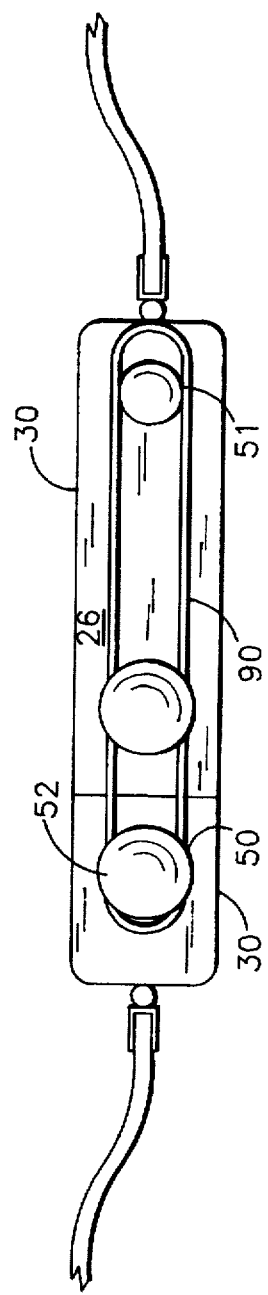
FIG. 5 is a top plan view of FIG. 1 showing the top portions of an embodiment of the interlocking members of the invention.

Jewelry clasp 10 is easy and convenient to remove. The wearer applies an upward force to resilient clip 90 thus moving clip 90 clear of post 51, as shown in FIG. 3. Once interior 92 is clear of post 51, clip 90 is moved rearwardly relative to post 50 passing through slot 68. Clip 90 is moved rearwardly until substantially all of clip 90 is positioned away from the general vicinity of bores 29 and rearward of post 50. See FIG. 2. Pin 60 is then loosened and removed from bores 29. Interlocking members 30 can then be separated, and clasp 10 and pin 60 can be placed away for safe keeping.

Jewelry clasp 10 of the invention does not have spring-loaded elements, which become inelastic, need repair, and break. Resilient clip 90 securely locks pin 60 within bores 29 of clasp 10 ensuring clasp 10 does not come unfastened while the jewelry is being worn. In addition, the wearer can easily manipulate pin 60 and clip 90 between open and closed positions making jewelry clasp 10 quick and convenient to operate. Finally, jewelry clasp 10 is both functionally sound and aesthetically pleasing.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. A jewelry clasp comprising a pair of opposite interlocking members, the interlocking members each have a top portion, a bottom portion, and forward and rearward ends, an upstanding post is secured to the top portion of each of the interlocking members, a bore for receiving a pin extends through the forward ends of each of the interlocking members, a resilient locking clip with an interior is positioned on the posts for securing the pin when the pin is in the bore and the interlocking members are locked together in a closed position.

2. The jewelry clasp of claim 1 wherein each of the interlocking members has forward end tines, and the bore is a plurality of bores with one each passing through each of the tines, respectively, so that all of the bores are axially aligned when the clasp is in the closed position.

3. The jewelry clasp of claim 2 wherein at least one of the bores and at least a portion of the shank of the pin have complementary threads.

4. The jewelry clasp of claim 3 wherein the pin has a top and a terminal end, the top of the pin protrudes a height at least as great as the posts when the pin is fully inserted in the bore.

5. The jewelry clasp of claim 1 wherein the pin has a top, a body and a terminal end, the top of the pin protrudes a height at least as great as the posts when the pin is fully inserted in the bore.

6. The jewelry clasp of claim 1 wherein at least a portion of the bore and at least a portion of the shank of the pin have complementary threads.

7. A jewelry clasp comprising a pair of opposite interlocking members with a top portion, a bottom portion, and forward and rearward ends, respectively, each of the interlocking members has forward end tines, each of the tines has a bore extending therethrough, a pin for inserting through the bores to lock the interlocking members together in a closed position, the pin has a top, a body and a terminal end, an upstanding post is secured to the top portion of each of the interlocking members, the top of the pin protrudes a height at least as great as the posts when the pin is fully inserted in the bores, a resilient locking clip with an interior is positioned on the posts for securing the pin when the clasp is in the closed position, one of the posts has a terminal head such that the clip cannot be separated from the clasp.

8. The jewelry clasp of claim 7 wherein at least one of the bores and at least a portion of the body of the pin have complementary threads.

9. A jewelry clasp comprising a pair of opposite interlocking members with top portions, bottom portions, and forward and rearward ends, respectively, each of the interlocking members has forward end tines, each of the tines has a transverse bore extending therethrough, a pin for inserting through the bores to lock the interlocking members together in a closed position, the pin has a top, a terminal end and a body therebetween, an upstanding post is secured to the top portion of each of the interlocking members, a bore extends through the top of the pin, and the top of the pin protrudes a height at least as great as the posts when the pin is fully inserted in the bores, at least one of the bores and at least a portion of the body have complementary threads, a resilient locking clip with an interior is positioned on the posts for securing the pin when the clasp is in the closed position, one of the posts has a terminal head larger than the interior of the clip such that the clip cannot be separated from the clasp.

10. The jewelry clasp of claim 9 wherein a second bore extends through the terminal end of the pin.

11. The jewelry clasp of claim 9 wherein the locking clip passes through the bore in the top of the pin when the interior is positioned on the posts.

12. The jewelry clasp of claim 11 wherein the terminal end of the pin has a second bore extending therethrough.

* * * * *